(12) United States Patent
Williamson

(10) Patent No.: US 7,801,929 B2
(45) Date of Patent: Sep. 21, 2010

(54) PYRAMID REPORTING TOOL

(75) Inventor: Eric J. Williamson, Fuquay Varina, NC (US)

(73) Assignee: Red Hat, Inc., Raleigh, NC (US)

( * ) Notice: Subject to any disclaimer, the term of this patent is extended or adjusted under 35 U.S.C. 154(b) by 390 days.

(21) Appl. No.: 12/074,035

(22) Filed: Feb. 29, 2008

(65) Prior Publication Data

US 2009/0222476 A1    Sep. 3, 2009

(51) Int. Cl.
 *G06F 17/30* (2006.01)
(52) U.S. Cl. .................................. 707/805; 707/706
(58) Field of Classification Search .............. 707/1–3, 707/6–7, 10, 100–102, 103 Y, 104.1, 706, 707/707, 736, 793, 798, 797, 803, 805
See application file for complete search history.

(56) References Cited

U.S. PATENT DOCUMENTS 6,092,050 A * 7/2000 Lungren et al. ............ 705/36 R

* cited by examiner

*Primary Examiner*—Cam-Linh Nguyen
(74) *Attorney, Agent, or Firm*—Blakely, Sokoloff, Taylor & Zafman LLP

(57) ABSTRACT

A method and apparatus for a dimensional pyramid reporting tool. In one embodiment, the method includes identifying dimensions associated with one or more databases, and receiving user input specifying the number of reporting levels. The method further includes receiving user input linking the dimensions with corresponding reporting levels, and creating a table for each of the reporting levels to store dimensions linked to a corresponding reporting level.

24 Claims, 10 Drawing Sheets

PYRAMID REPORTING TOOL

TECHNICAL FIELD

Embodiments of the present invention relate to data reporting, and more specifically, to a pyramid reporting tool.

BACKGROUND

Data stored in a database is usually transactional in nature. A database may be a transactional database or a relational database. Transactional databases simply are a collection of transaction tables. Relational databases add the capacity to match tables together and perform other functions. Since relational databases provide ways to match and organize data, more insight can be achieved through them. Hence, most databases systems by default are relational (encompassing the transactional as well as relational capacity). These databases are intended to contain data in a format that will allow it to be completely matchable with other data in the database or other outside databases. However, this data is not organized in a manner where the natural relationships become apparent or easily utilized. Rather, the relationships in the data are defined and maintained by the application running on top of the database. An individual can only see the relationships in the data if he or she already has an understanding of the database structure and the application functionality.

Database administrators (DBAs) utilizing data for reporting and analysis have attempted to overcome this limitation of data storage using a technique known as On-Line Analytical Processing (OLAP). OLAP provides a capability for copying data from a production (application driven) database into separate OLAP tables. While a production database tends to store the data in many small tables with few columns, OLAP tends to shift the production data into fewer, larger tables with many columns.

OLAP uses dimensions that represent relationship descriptors, categories or drivers. Examples of dimensions may include Time, Location, Product, Industry, Account, etc. Dimensions can be organized into "cubes". A cube contains dimensions and a snippet of data (typically a number) which are reflected by the intersection of dimension selections. There are currently three main OLAP cube systems: ROLAP, in which the cube is virtual, calculated on the fly from the OLAP tables themselves; MOLAP, a literal cube of just dimensions and the intersection data stored separately from, or inside an OLAP table or in the computers RAM memory; and HOLAP, which is a hybrid of ROLAP and MOLAP.

The cube system has helped to fill some of the gaps between relational databases and the natural relationships of data. However, cubes also have weaknesses. The cube system is still a relational system with perfectly matchable data. In fact, the cube system is even more so because the cube treats each dimension equally. The natural relationships of data can still be expressed, but typically through many small cubes with different dimensions to capture the relationship. The second weakness of a cube system is that since cubes utilize intersections, dimensions need to be few and small or the process can create unwieldy cubes with many empty spaces (a cube can contain all possible dimension intersections, even if the data does not exist). Therefore cubes tend to eliminate details that may be important, but inexpressible in that format. Further, OLAP dimensions are not easily organized, nor are they easily matched across databases. Dimensions may contain the same theme (like "time") but because the elements are different, joining dimensions together are difficult because they are not naturally defined in the database. Moreover, OLAP reporting systems cannot effectively respond to ad-hoc drill-down requests because they do not differentiate between high level and low level data. DBAs have to setup various processes and procedures to anticipate possible drill-down requests of end users.

BRIEF DESCRIPTION OF THE DRAWINGS

The present invention is illustrated by way of example, and not by way of limitation, in the figures of the accompanying drawings and in which.

DETAILED DESCRIPTION

Figure 1:
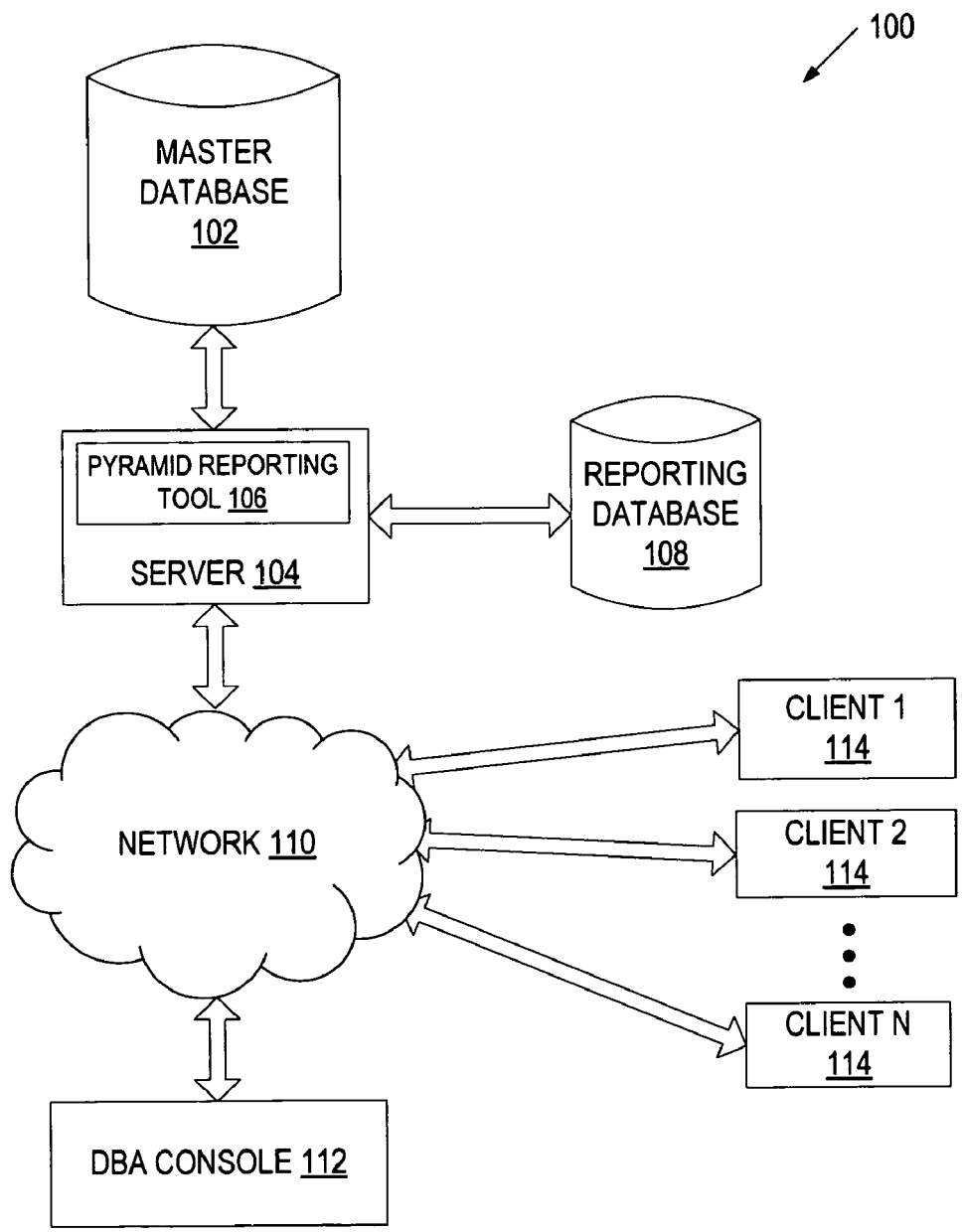
FIG. 1 illustrates a network architecture in which embodiments of the present invention may be implemented.

Described herein is a method and apparatus for a pyramid reporting tool. In one embodiment, the pyramid reporting tool identifies dimensions associated with one or more databases, displays these dimensions to a user such as a database administrator (DBA), and allows the user to specify the number of levels for a reporting pyramid and to link the dimensions to corresponding reporting levels. The pyramid reporting tool then creates a table for each of the reporting levels to store dimensions linked to a corresponding reporting level.

Subsequently, the pyramid reporting tool can utilize the tables corresponding to different reporting levels to present reports to end-users. In particular, the pyramid reporting tool may receive end-user input specifying a reporting level and query parameters, and may access a table associated with the specified reporting level to retrieve data corresponding to the query parameters. This retrieved data is then transformed into a report and displayed to the end-user. The pyramid reporting tool also allows the end-user to submit an ad-hoc drill-down request for any data element in the report, and displays requested data by moving down to the next level of the reporting pyramid, and accessing a table associated with the next level to obtain requested data.

One advantage of the embodiments described herein is that they allow capturing the natural relationships of data by using different reporting levels and maintaining a table at each reporting level. Various degrees of details can be provided at different reporting levels, with a few details at the top of the reporting pyramid and numerous details at the bottom of the reporting pyramid. Some embodiments can also allow database data to be easily organized and easily matched across databases via matching levels. Furthermore, some embodiments allow for effective processing of ad-hoc drill-down requests by moving down to the next pyramid level and accessing the table associated with this pyramid level.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include client devices (clients) 114, a server 104, a DBA console 112, and a network 110. The clients 114 may be, for example, personal computers (PCs), mobile phones, palm-sized computing devices, personal digital assistants (PDAs), and the like. Each client 114 contains hardware components and software components including a browser application to render data provided by the server 104.

The server 104 may be, for example, a server computer, a PC, or any other machine. The server 104 may be coupled to the clients 114 via the network 110, which may be a public network (e.g., Internet) or a private network (e.g., Ethernet, a Local Area Network (LAN), or a corporate intranet). In addition, the server 104 may be coupled to a console 112 via the network 110. The console 112 may be operated by a DBA and may be, for example, a PC, a PDA, a mobile phone, etc. The console 112 may contain hardware components and software components including a browser application to render data provided by the server 104.

The server 104 may be coupled to a master database 102 which may reside on one or more storage devices. The server 104 may access the master database 102 directly or via a network (e.g., a private or public network). The master database 102 may represent one or more production databases of an organization or multiple organizations. A production database may be a large relational or transactional database.

The server 104 may host a pyramid reporting tool 106 that transforms data from the master database 102 to be more suitable for reporting and stores the transformed data in a reporting database 108. The reporting database 108 may reside on one or more storage devices and may be accessible to the pyramid reporting tool 106 via a network (private or public network) or directly. The pyramid reporting tool 106 provides graphical user interfaces (GUIs) to assist a DBA operating the console 112 in populating the reporting database 108. In addition, the pyramid reporting tool 106 provides GUIs to assist end users operating the client devices 114 in viewing reports based on production data. As will be discussed in more detail below, the pyramid reporting tool 106 uses a pyramid model to simplify storage of production data in the reporting database 108 and to facilitate efficient reporting capabilities. A reporting pyramid as referred to herein provides a visual representation of production data transformed for reporting, with the top of the pyramid having the least amount of detail, and the bottom of the pyramid including the most details.

Figure 2:
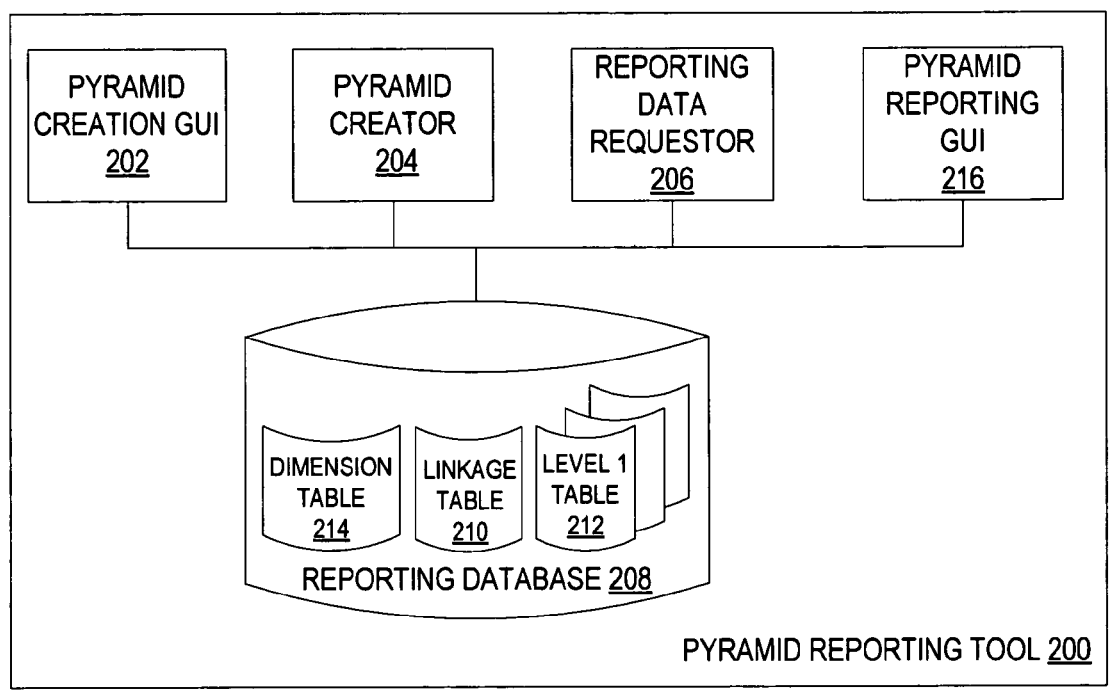
FIG. 2 illustrates a block diagram of one embodiment of a pyramid reporting tool.

FIG. 2 is a block diagram of one embodiment of a pyramid reporting tool 200. The pyramid reporting tool 200 may include a pyramid creation GUI 202, a pyramid creator 204, a reporting data requestor 206, a pyramid reporting GUI 216, and a reporting database 208.

The pyramid creation GUI 202 allows a user such as a DBA to view data fields (e.g., data element names or column names) included in a production database and to create dimensions from the data fields. The pyramid creator 204 may then store the mappings between the production data fields and the dimensions in a dimension table 214 of the reporting database 208. In addition, the pyramid creation GUI 202 may allow a DBA to specify a desired number of levels for a reporting pyramid, and to link dimensions to specific levels of the reporting pyramid. An exemplary GUI 202 will be discussed in more detail below in conjunction with FIGS. 5A and 5B. The pyramid creator 204 creates a table 212 for each level of the reporting pyramid in the reporting database 208, and stores relationships between the tables 212 in a linkage table 210 of the reporting database.

The pyramid reporting GUI 216 allows end users to request specific reports, and the reporting data requestor 206 processes these reporting requests of end users by accessing a table associated with an appropriate reporting level. As will be discussed in more detail below, the reporting level may be provided by the end user or be inferred based on the end user's identifier.

The pyramid reporting GUI 216 presents reports to end users, and allows an end user to submit an ad-hoc drill-down request for any element of the report. An exemplary GUI 216 will be discussed in more detail below in conjunction with FIGS. 7A and 7B. Upon receiving a drill-down request, the reporting data requestor 206 moves down to a next reporting level and accesses the table associated with this next reporting level to provide requested data.

Figure 3:
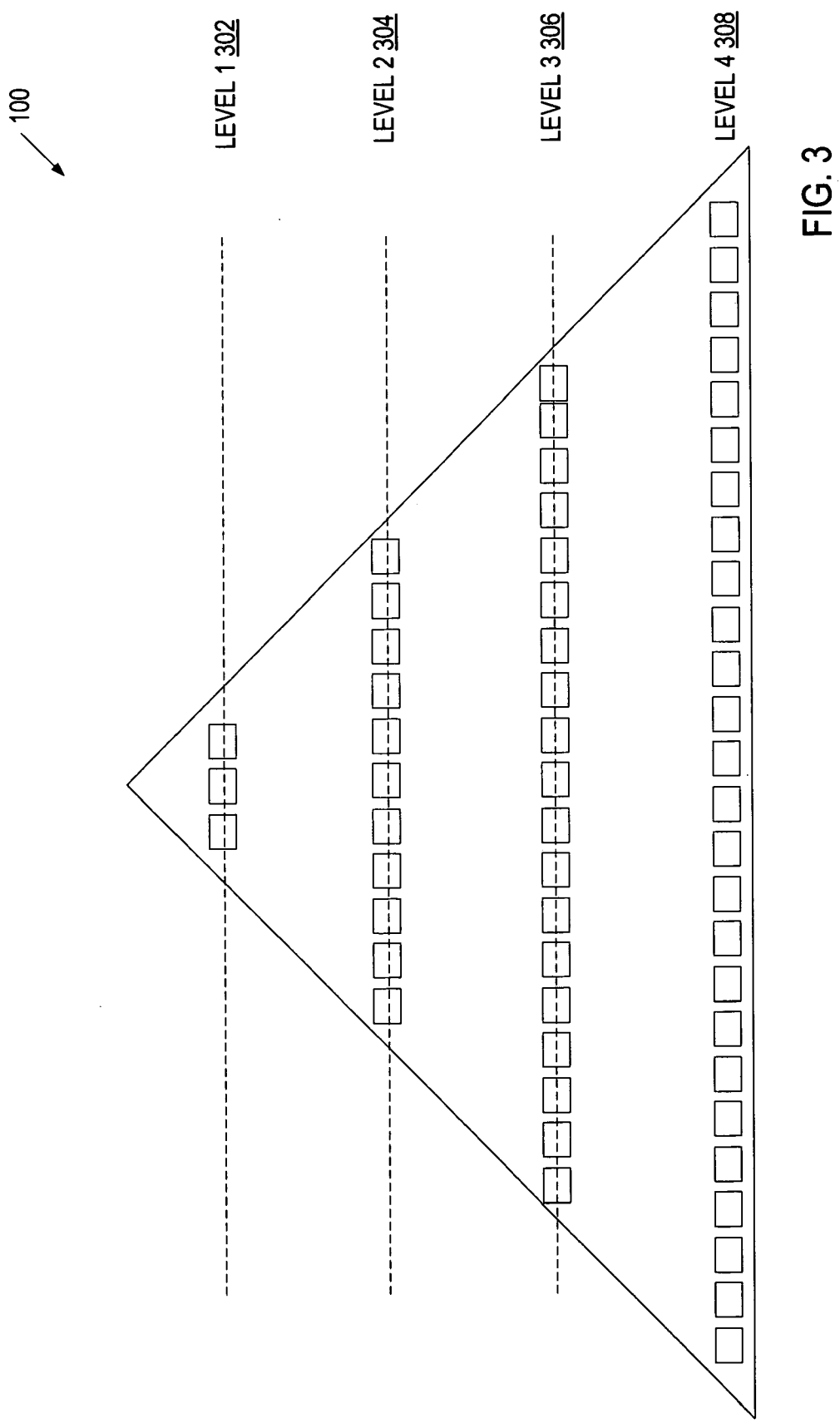
FIG. 3 illustrates an exemplary reporting pyramid in accordance with one embodiment of the invention.

FIG. 3 illustrates a pyramid-like nature of production data transformed for reporting. When requesting reports, user are likely to start with a small amount of detail and then drill down to request more details for specific components of the report. This approach is reflected in a reporting pyramid 300. In particular, the top reporting level 302 includes the least number of dimensions. Level 304 positioned underneath the top level 302 includes more dimensions than the top level 302. Level 306 positioned underneath the level 304 includes more dimensions than the preceding level 304, and the bottom level 308 includes even more dimensions than the preceding level 306. Each reporting pyramid level may be associated with specific individuals within the organization. For example, the CEO may be mostly interested in the top level summary data to analyze overall statistics of the organization. A regional manager may be mostly interested in a lower level data that provides summary data for different departments within the region. A salesperson in a specific department may be mostly interested in data describing his or her department, and may not even have access to the top level organization data or region summary data. Pyramid 300 reflects this reporting model.

In one embodiment, a table is created for each reporting level to store dimensions available at a relevant reporting level (plane) and to allow users to easily move between the different planes. Different tables can be setup for different people, different views, different access levels, etc. The tables can be organized in various ways. In one embodiment, the tables can be organized using the MOLAP approach (first approach) and can contain only an index and one master value (the intersection or summary value in the MOLAP cube). In another embodiment, the tables may be organized using an enhanced MOLAP approach (second approach) by containing an index and a master value, and also having an additional value (which can be an index to a different database/schema for additional drilling, description, etc.). In yet another embodiment, the tables can be organized using a further enhanced MOLAP approach (third approach) and can contain an index, a master value, and additional multiple values or details formatted as a flat table. Such a flat table may use row delimiters and be compacted into a row size. For example, below is an exemplary Table 1:

TABLE 1

| Car | Color | Year |
|---|---|---|
| Buick | Red | 2006 |
| Ford | Blue | 1999 |
| Chevy | White | 2002 |

Table 1 can be converted into a single row using row delimiters as follows:

Buickμ Fordμ Chevy?redμ blueμ white?2006μ1999μ2002

In still alternative embodiments, a combination of the above table organization approaches can be used for different reporting planes. For example, the first approach may be used for the top planes of the pyramid, the second approach can be used for middle level planes where slightly more details are desirable, and the third approach may used for the base of the pyramid where unsummarized data is contained or as a basis for data mining (e.g., storing statistics or drilling metadata in the flat table).

Figure 4:
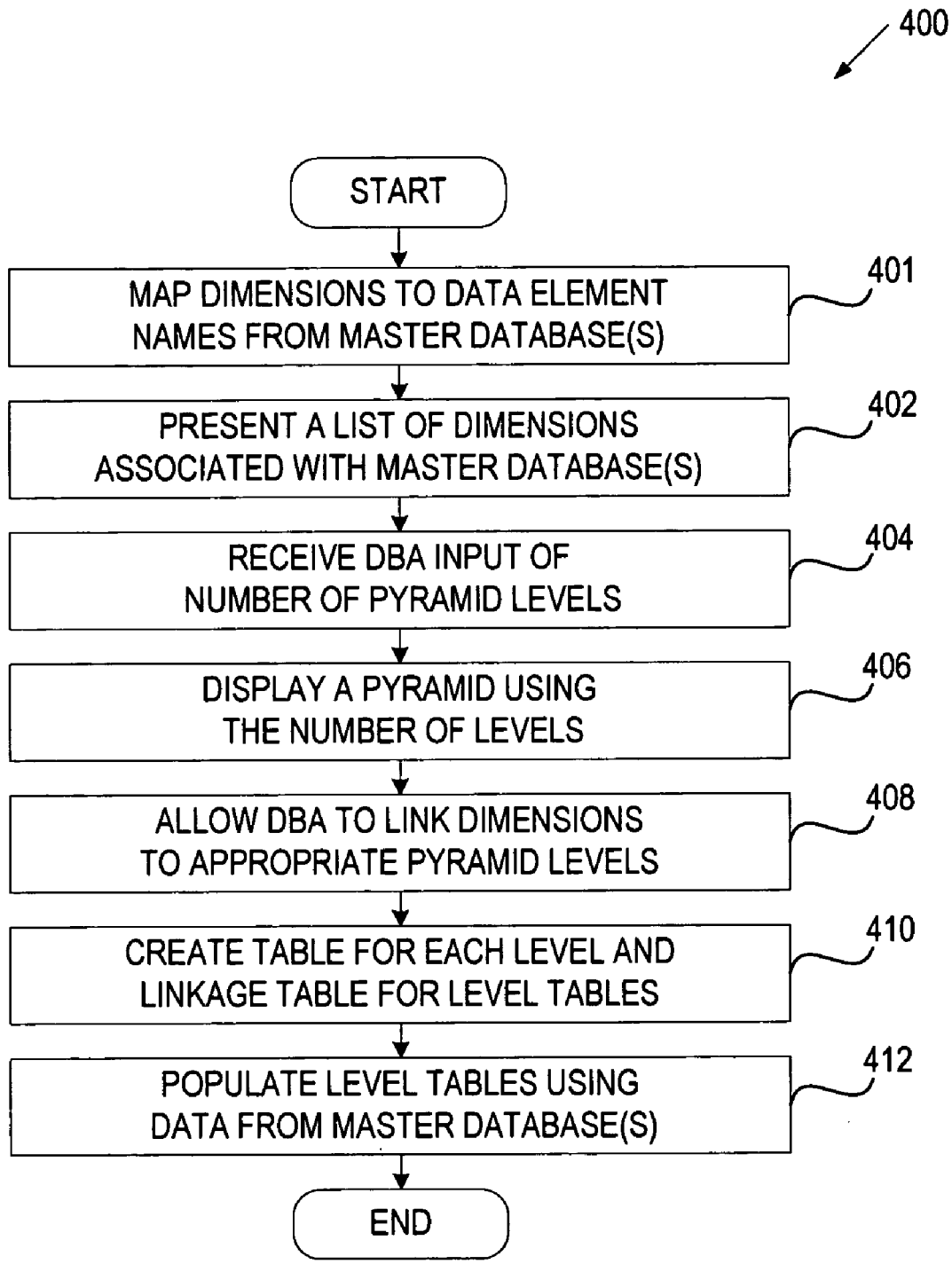
FIG. 4 illustrates a flow diagram of one embodiment of a method for creating a reporting pyramid.

FIG. 4 illustrates a flow diagram of one embodiment of a method 400 for creating a reporting pyramid. The process 400 may be performed by processing logic that may comprise hardware (e.g., circuitry, dedicated logic, programmable logic, microcode, etc.), software (such as instructions run on a processing device), or a combination thereof. In one embodiment, the process 400 is performed by the pyramid reporting tool 106 of FIG. 1.

Referring to FIG. 4, method 400 begins with processing logic mapping dimensions to data element names from one or more master (production) databases (block 401). The mapping may be recorded in a dimension table of a reporting database based on user input specifying dimensions for corresponding data element names from the master database (e.g., via a dimension mapping UI). The user may be a DBA or some other person understanding with the structure of the production database (collectively referred to herein as a DBA).

At block 402, processing logic presents a list of dimensions associated with one or more master databases identified by the DBA (e.g., in a pyramid creation UI). At block 404, processing logic receives DBA input identifying the number of pyramid levels (e.g., via the pyramid creation UI). Alternatively, the number of pyramid levels may be predetermined for a specific production database, company organization, reporting goals, etc.

At block 406, processing logic displays a pyramid based on the number of levels (e.g., in the pyramid creation UI). At block 408, processing logic allows the DBA to link dimensions to appropriate pyramid levels (e.g., via the pyramid creation UI).

At block 410, processing logic creates a table for each pyramid level and a linkage table in the reporting database. Each pyramid level table may be created using one of the table organization approaches discussed above. At block 412, processing logic populates the tables associated with the pyramid levels using production data in the master database(s).

Figure 5A:
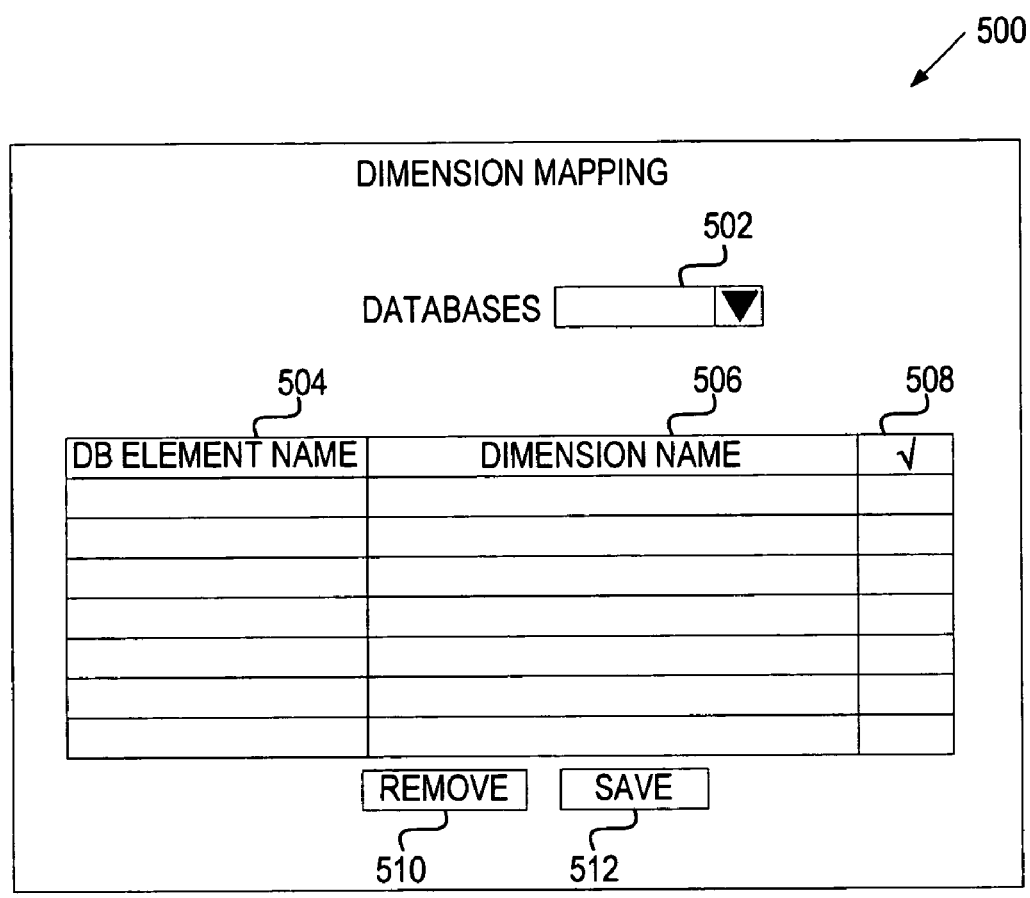
FIGS. 5A and 5B illustrate exemplary user interfaces for creating a reporting pyramid in accordance with one embodiment of the invention.
Figure 5B:
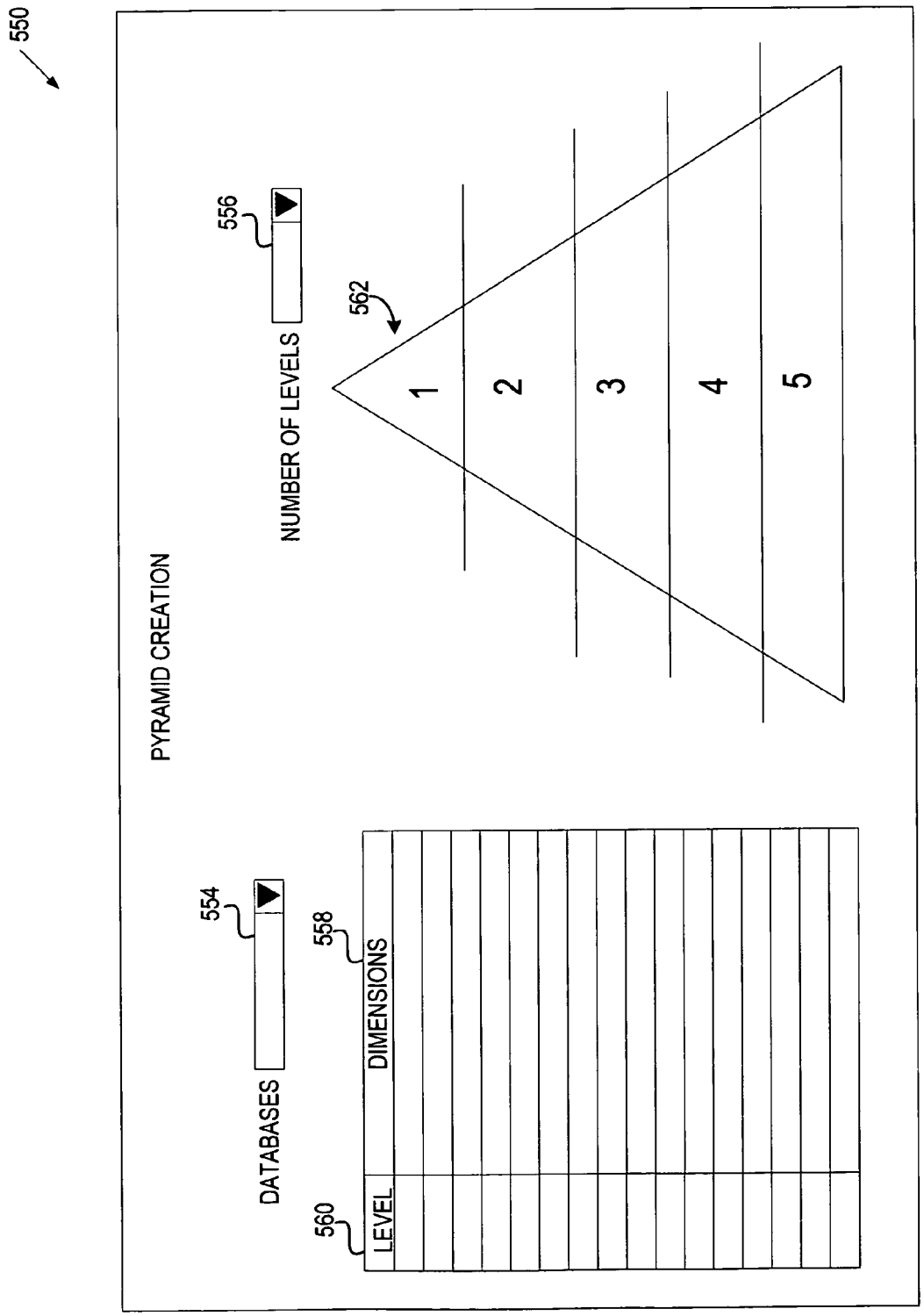

FIGS. 5A and 5B illustrate exemplary UIs for creating a reporting pyramid, in accordance with one embodiment of the invention. Referring to FIG. 5A, a dimension mapping UI 500 facilitates user input 502 of one or more databases. In response, a list 504 of fields or element names from the specified database(s) is displayed to the user. The user can then provide a dimension name 506 for some or all element names 504 and may remove some database elements 504 from the list by suing a check box 508 and clicking remove button 510. If the user does not provide a dimension name 506, a database name 504 may be used as a dimension name. By providing a dimension name 506, the user may ensure that database elements having the same meaning but different database names have the same dimension name, which can be especially useful when matching data from multiple databases.

Referring to FIG. 5B, a pyramid creation UI 550 facilitates user input of the number of levels 556 to be used for the reporting pyramid being created. Upon receiving the user input of the number of levels, a pyramid 562 is presented to the user. The user can then specify one or more production databases 554, resulting in the display of the list of dimensions 558 associated with specified database(s) 554. In addition, the pyramid creation UI 550 allows the user to assign a reporting level to each dimension 558. The reporting level may be assigned when the user drags and drops the dimension 558 to the desired level of the pyramid 562. This action will cause level field 560 to be updated with the relevant level number. Alternatively, the user can enter the desired level number in the field 560 for each dimension 558.

Figure 6:
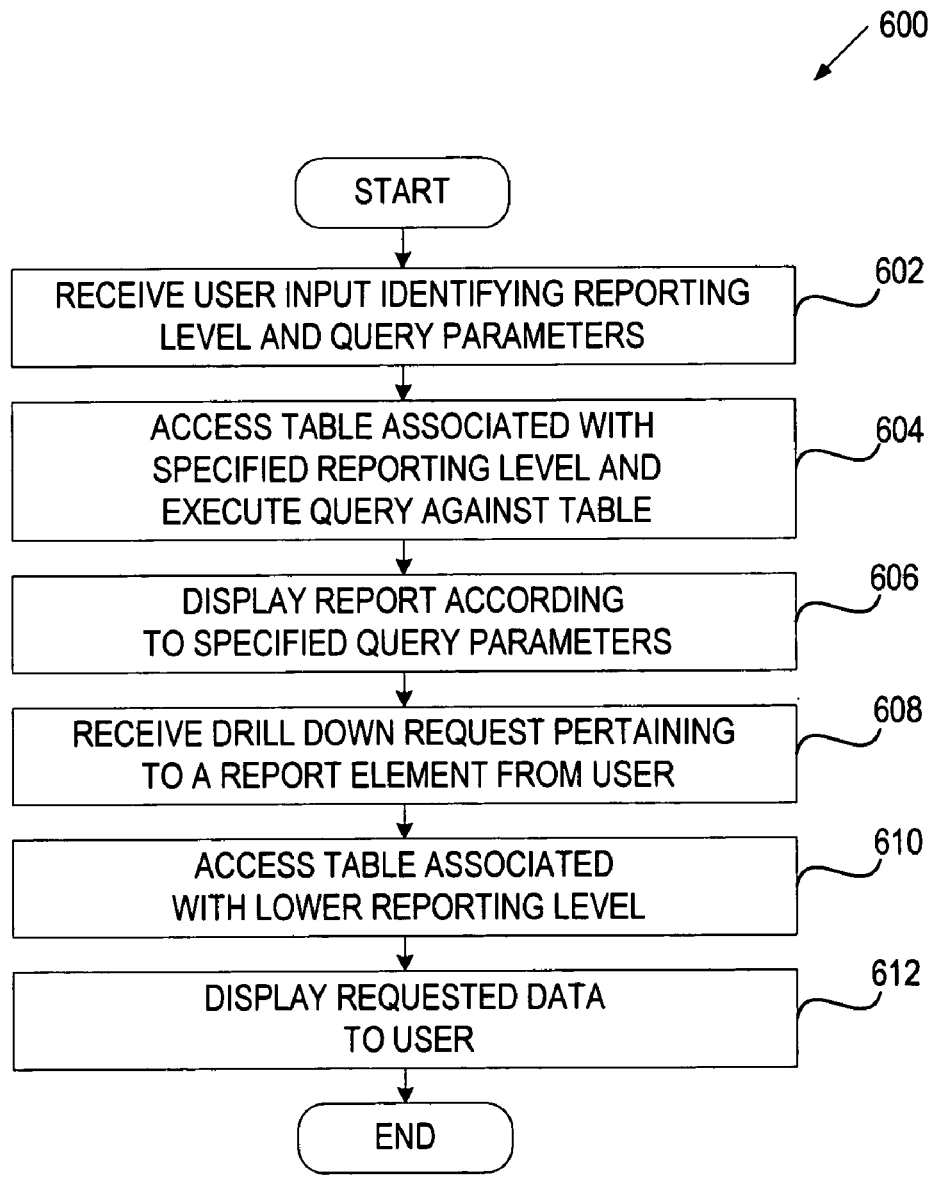
FIG. 6 illustrates a flow diagram of one embodiment of a method for presenting reports using a reporting pyramid.

FIG. 6 illustrates a flow diagram of one embodiment of a method 600 for presenting reporting data using a reporting pyramid. The process 600 may be performed by processing logic that may comprise hardware (e.g., circuitry, dedicated logic, programmable logic, microcode, etc.), software (such as instructions run on a processing device), or a combination thereof. In one embodiment, the process 600 is performed by the pyramid reporting tool 106 of FIG. 1.

Referring to FIG. 6, method 600 begins with processing logic receiving user input identifying the reporting level and query parameters (e.g., a pyramid reporting UI) (block 602). In one embodiment, the user enters the desired reporting level. Alternatively, the reporting level is determined based on the user identifier (e.g., based on the user position or access privilege).

At block 604, processing logic accesses a table associated with the reporting level in a reporting database and executes a query against this table. At block 606, processing logic displays a report using the result of the query (e.g., in the pyramid reporting UI).

At block 608, processing logic receives an ad-hoc drill-down request pertaining to a report element from the user (e.g., via the pyramid reporting UI). At block 610, processing logic accesses a table associated with a lower reporting level (one reporting level below), and submits a query to obtain more detailed data for the selected report element. At block 612, processing logic displays the obtained data to the user (e.g., in the pyramid reporting UI).

Figure 7A:
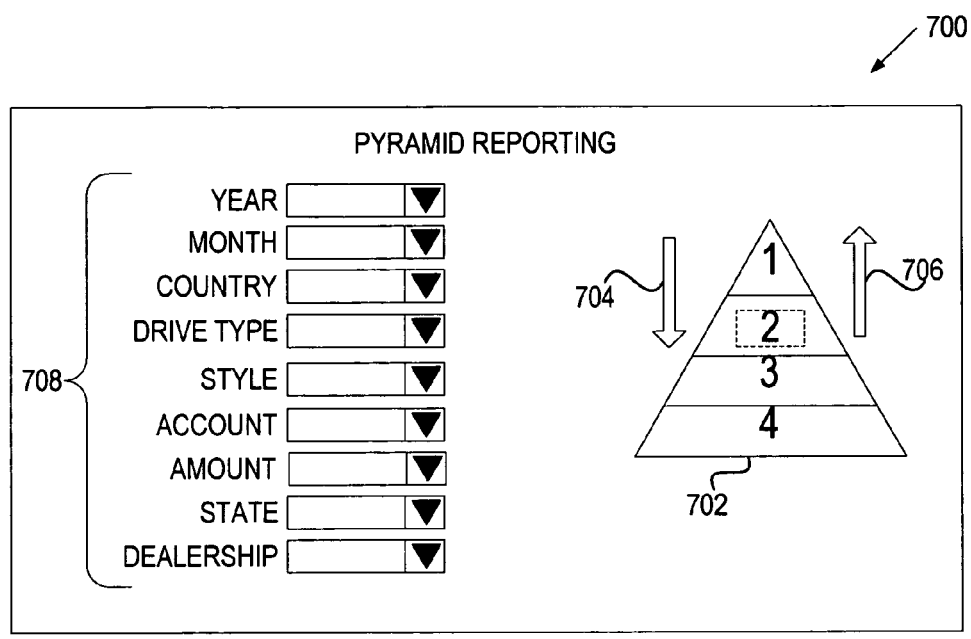
FIGS. 7A and 7B illustrate exemplary user interfaces for presenting reports using a reporting pyramid.
Figure 7B:
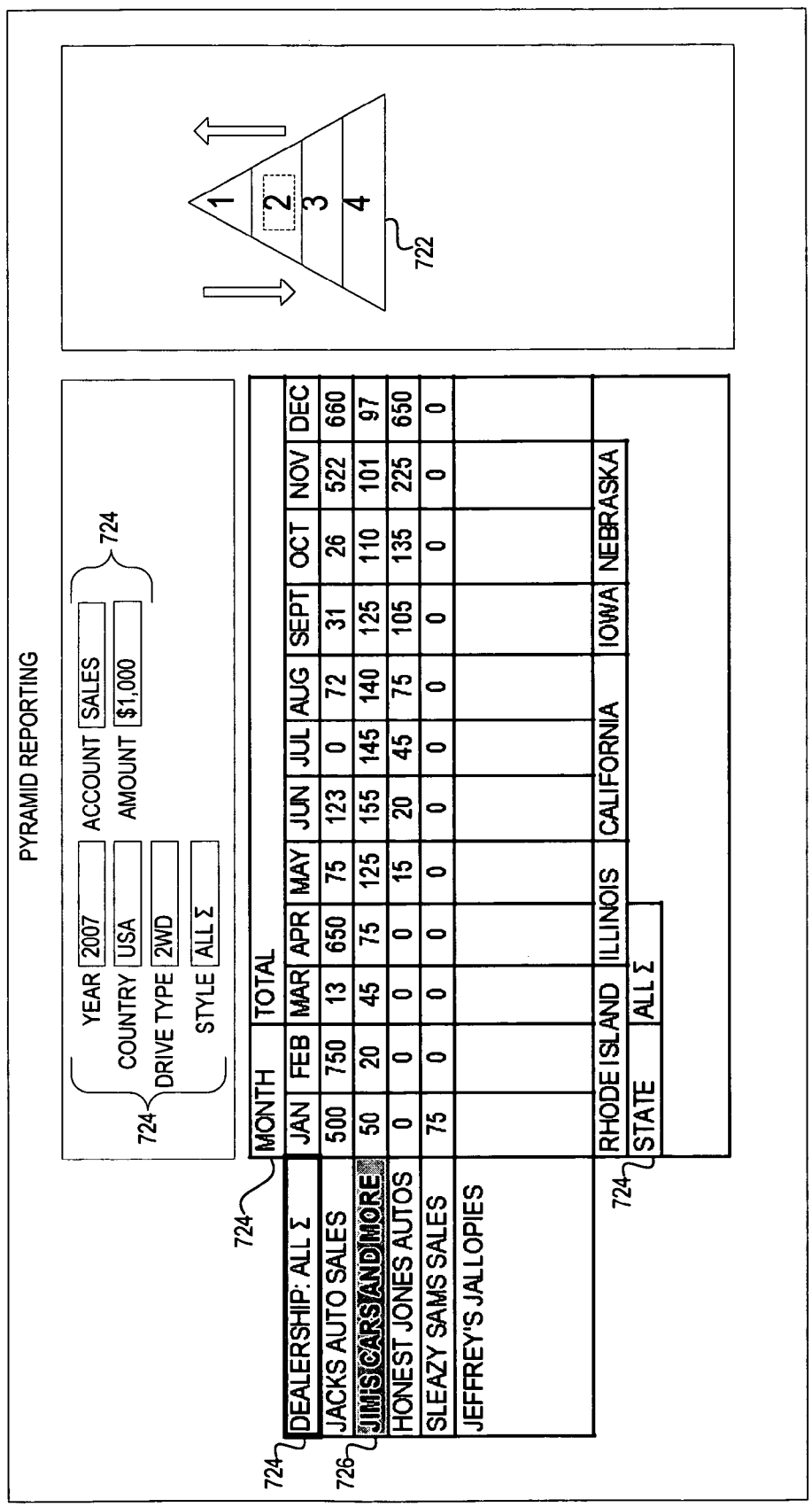

FIGS. 7A and 7B illustrate exemplary UIs for displaying reports, in accordance with one embodiment of the invention. Referring to FIG. 7A, a pyramid reporting UI 700 facilitates user input of the reporting level using arrows 704 and 706. The selected reporting level may then be highlighted in the pyramid 702. In addition, the pyramid reporting UI 700 displays dimensions 708 associated with the selected reporting level and allows the user to provide desired values for the dimensions 708 to specify query parameters. If the user changes the current reporting level, the pyramid reporting UI 700 will display a different set of dimensions 708 corresponding to the new reporting level.

Referring to FIG. 7B, a pyramid reporting UI 720 is presented in response to the user selection of the dimension values. Dimensions 724 are displayed in the UI 720 with the values specified by the user on the previous screen (the UI 700). The pyramid 722 is also displayed in the pyramid reporting UI 720 with the current reporting level being highlighted. The pyramid reporting UI 720 also allows the user to submit an ad-hoc drill-down request for any element in the report. The drill-down request may be submitted by clicking the desired element (e.g., element 726). In response, detailed information for the selected element can be displayed to the user in a popup window or a new screen.

Figure 8:
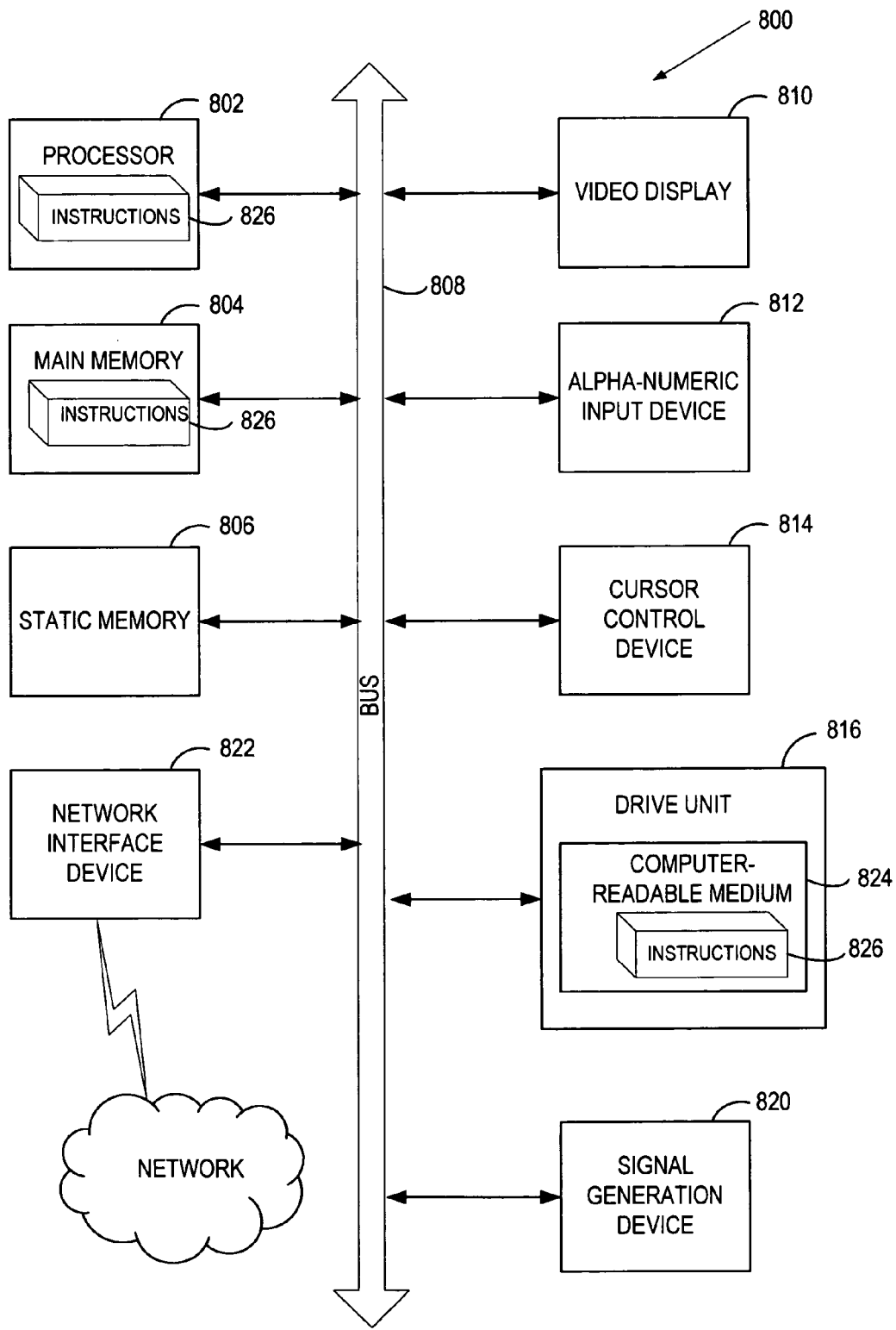
FIG. 8 illustrates a block diagram of an exemplary computer system implementing some embodiments of the present invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-readable storage medium (or more specifically a computer-readable storage medium) 831 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-readable storage media. The software 822 may further be transmitted or received over a network 820 via the network interface device 808.

The machine-readable storage medium 831 may also be used to store master object files and/or deployed object files (e.g., the master object files 106 and/or the deployed object files 270 of FIG. 2), and/or a software library containing methods performed by the data manager 108 and/or devices 102. While the machine-readable storage medium 831 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and system for efficiently distributing data objects over a network have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
receiving, by a server computing system user input providing mapping of data element names from one or more databases to a plurality of dimensions associated with the one or more databases;
recording the plurality of dimensions in a mapping table;
receiving by the server computing system user input specifying a number of reporting levels;
receiving, by the server computing system user input linking the plurality of dimensions with corresponding reporting levels;
creating a table for each of the reporting levels to store dimensions linked to a corresponding reporting level.

2. The method of claim 1, further comprising:
receiving a user request to provide the plurality of dimensions associated with the one or more databases; and
retrieving the plurality of dimensions from the mapping table.

3. The method of claim 1, further comprising:
displaying a reporting pyramid upon receiving user input specifying the number of reporting levels.

4. The method of claim 3, wherein receiving user input linking the plurality of dimensions with corresponding reporting levels comprises:
providing a user interface allowing a user to drag and drop the plurality of dimensions to desired reporting levels in the reporting pyramid; and
displaying, in the user interface, a reporting level for each of the plurality of dimensions.

5. The method of claim 4 wherein the user is a database administrator.

6. The method of claim 1, wherein:
a table for a higher reporting level includes an index and a master value;
a table for a medium reporting level includes an index, a master value, and an additional value; and
a table for a lower reporting level includes an index, a master value, and a plurality of additional values organized as a flat table.

7. A computer-implemented method comprising:
receiving, by a server computing system user input specifying a reporting level;
displaying a list of dimensions associated with the specified reporting level;
receiving by the server computing system parameters for one or more of the dimensions;
creating, by the server computing system a query for a table associated with the specified reporting level, the query being based on the parameters;
accessing the table associated with the specified reporting level to retrieve data corresponding to the query;
displaying a report using the retrieved data; and
allowing a user to submit an ad-hoc drill-down request for any data element in the report.

8. The method of claim 7, wherein receiving user input specifying the reporting level comprises:
providing a user interface facilitating user input of the reporting level.

9. The method of claim 7 further comprising:
receiving the ad-hoc drill-down request for an element in the report;
accessing a table associated with a lower level reporting to retrieve data requested for the element in the report; and
displaying the retrieved data to the user.

10. A system comprising:
a pyramid creation user interface (UI) to receive user input specifying a number of reporting levels, and to receive user input linking a plurality of dimensions associated with one or more master databases to corresponding reporting levels;
a pyramid creator, coupled to the pyramid creation UI, to create a table for each of the reporting levels to store dimensions linked to a corresponding reporting level; and
a reporting database, coupled to the pyramid creator, to include tables for the reporting levels and a mapping table to store mappings of data element names from the one or more master databases to the plurality of dimension.

11. The system of claim 10 wherein the mappings are specified by a user via the pyramid creation UI.

12. The system of claim 10, wherein the pyramid creation UI is to display a reporting pyramid upon receiving user input specifying the number of reporting levels.

13. The system of claim 12 wherein the pyramid creation UI is to allow a user to drag and drop the plurality of dimensions to desired reporting levels in the reporting pyramid, and to display, in the user interface, a reporting level for each of the plurality of dimensions.

14. The system of claim 10, wherein the database comprises:
a table for a higher reporting level including an index and a master value;

a table for a medium reporting level including an index, a master value, and an additional value; and a table for a lower reporting level including an index, a master value, and a plurality of additional values organized as a flat table.

15. The system of claim 10, further comprising:

a reporting UI to receive user input specifying a reporting level and query parameters; and a reporting data requester, coupled to the reporting UI and the reporting database, to access a table associated with the specified reporting level to retrieve data corresponding to the query parameters.

16. The system of claim 15 wherein the reporting UI is to display a report using the retrieved data, and to allow a user to submit an ad-hoc drill-down request for any data element in the report.

17. The system of claim 16 wherein:

the reporting UI is to receive the ad-hoc drill-down request for an element in the report, and to display data retrieved from a table associated with a lower level reporting based on the ad-hoc drill-down request.

18. A computer readable storage medium including instructions that, when executed by a processing system, cause the processing system to perform a method comprising:

receiving user input providing mapping of data element names from one or more databases to a plurality of dimensions associated with the one or more databases;

recording the plurality of dimensions in a mapping table;

receiving user input specifying a number of reporting levels;

receiving user input linking the plurality of dimensions with corresponding reporting levels;

creating a table for each of the reporting levels to store dimensions linked to a corresponding reporting level.

19. The computer readable medium of claim 18, wherein the method further comprises:

receiving a user request to provide the plurality of dimensions associated with the one or more databases; and retrieving the plurality of dimensions from the mapping table.

20. The computer readable medium of claim 18, wherein the method further comprises:

displaying a reporting pyramid upon receiving user input specifying the number of reporting levels;

providing a user interface allowing a user to drag and drop the plurality of dimensions to desired reporting levels in the reporting pyramid; and displaying, in the user interface, a reporting level for each of the plurality of dimensions.

21. The computer readable medium of claim 18, wherein:

a table for a higher reporting level includes an index and a master value;

a table for a medium reporting level includes an index, a master value, and an additional value; and a table for a lower reporting level includes an index, a master value, and a plurality of additional values organized as a flat table.

22. The computer readable medium of claim 18, wherein the method further comprises:

receiving user input specifying a reporting level and query parameters;

accessing a table associated with the specified reporting level to retrieve data corresponding to the query parameters;

displaying a report using the retrieved data; and allowing a user to submit an ad-hoc drill-down request for any data element in the report.

23. The computer readable medium of claim 22, wherein receiving user input specifying the reporting level and query parameters comprises:

providing a user interface facilitating user input of the reporting level;

upon receiving the reporting level, displaying, in the user interface, a list of dimensions associated with the specified reporting level;

receiving, via the user interface, parameters for one or more of the dimensions; and creating a query for the table associated with the specified reporting level, the query being based on the parameters.

24. The computer readable medium of claim 23, wherein the method further comprises:

receiving the ad-hoc drill-down request for an element in the report;

accessing a table associated with a lower level reporting to retrieve data requested for the element in the report; and displaying the retrieved data to the user.

* * * * *